United States Patent [19]

Komatsu

[11] Patent Number: 4,677,511
[45] Date of Patent: Jun. 30, 1987

[54] HEAD POSITION ADJUSTING DEVICE IN CASSETTE TAPE RECORDERS

[75] Inventor: Norimasa Komatsu, Kakuda, Japan

[73] Assignee: Alps Electric Co., Ltd., Japan

[21] Appl. No.: 686,641

[22] Filed: Dec. 27, 1984

[30] Foreign Application Priority Data

Dec. 28, 1983 [JP] Japan .................... 58-199134[U]

[51] Int. Cl.$^4$ .................... G11B 21/24; G11B 5/54
[52] U.S. Cl. .................... 360/109; 360/105
[58] Field of Search ............... 360/105, 109, 104, 137, 360/130.31

[56] References Cited

U.S. PATENT DOCUMENTS

| | | | |
|---|---|---|---|
| 2,535,480 | 12/1950 | Begun | 360/130.31 |
| 4,319,293 | 3/1982 | Tomabechi | 360/105 |
| 4,344,096 | 8/1982 | Tanaka | 360/105 X |

FOREIGN PATENT DOCUMENTS 58-166553 10/1983 Japan .................... 360/109
2060237 4/1981 United Kingdom ............... 360/137

*Primary Examiner*—Stuart N. Hecker
*Assistant Examiner*—Benjamin E. Urcia
*Attorney, Agent, or Firm*—Guy W. Shoup

[57] ABSTRACT

A head position adjusting device in a cassette tape recorder includes a movable head base supporting a head thereon, a pivotally movable play lever operatively coupled to the movable head base for moving the head toward and away from a cassette tape loaded in a prescribed position, a pin by which the head base and the play lever are interconnected with a clearance, and an adjustment screw for adjusting the relative position of the head base and the play lever. The head position adjusting device also includes a first connector plate mounted on the head base and a second connector plate mounted on the play lever and movable relatively to the first connector plate, the adjustment screw being threaded through the first connector plate and having an end held in abutment against the second connector plate.

1 Claim, 4 Drawing Figures

HEAD POSITION ADJUSTING DEVICE IN CASSETTE TAPE RECORDERS

BACKGROUND OF THE INVENTION

The present invention relates to a head position adjusting device for use in a cassette tape recorder.

There is known a conventional mechanism for driving a head base in a cassette tape recorder as illustrated in FIG. 1 of the accompanying drawings. The head base, indicated by the reference numeral 1, is urged by a spring means (not shown) to move downwardly in FIG. 1 and is movable reciprocally. A head 2 is fixed to the head base 1. Capstans 3 extend through the head base 1 and are positioned one on each side of the head 2, with pinch rollers 4 movable into and out of contact with the capstans 3. Designated at 5 is a pair of reels. A play lever 6 is driven by a power assist mechanism (not shown) comprising a solenoid or a motor. A drive plate 7 is coupled by a shaft 8 to the play lever 6. A spring 9 has opposite ends hooked respectively on the shaft 8 and a shaft 10 mounted on the head base 1.

FIG. 1 shows the position in which the parts are stopped for not recording and reproducing any information. When the play lever 6 is turned clockwise from the stop position, the head base 1 is moved upwardly against the spring means under the tension of the spring 9 to bring the head 2 into contact with a cassette tape loaded in a prescribed position for a playback mode. Upon the play lever 6 turned to the initial position, the head base 1 is moved downwardly by the drive plate 7 and the spring means, thus moving the head 2 away from the cassette tape toward the stop position illustrated in FIG. 1.

If the head 2 is not positioned as desired in the playback position in the cassette tape recorder and hence is not in good contact with the cassette tape, then problems such as wow and flutter, level variations, and poor frequency characteristics will be caused.

To cope with such difficulties, a stopper (not shown) is provided for preventing the head base 1 from approaching the cassette tape beyond a given interval. The play lever 6 is turned beyond an interval in which the head base 1 abuts against the stopper to allow any excessive stroke of the head base 1 to be absorbed by the spring 9 as it is elongated. Therefore, the head base 1 is required to be moved by a force greater than normally required which is so excessive as to put an increased load on the overall mechanism.

SUMMARY OF THE INVENTION

With the above prior difficulties in view, it is an object of the present invention to provide a head position adjusting device for cassette tape recorders which is capable of finely adjusting the position of a head with respect to a cassette tape and of reduce the load on the overall mechanism.

According to the present invention, there is provided a head position adjusting device in a cassette tape recorder, including a movable head base supporting a head thereon, a pivotally movable play lever operatively coupled to the movable head base for moving the head toward and away from a cassette tape loaded in a prescribed position, a pin by which the head base and the play lever are interconnected with a clearance, and an adjustment screw for adjusting the relative position of the head base and the play lever. The head position adjusting device also includes a first connector plate mounted on the head base and a second connector plate mounted on the play lever and movable relatively to the first connector plate, the adjustment screw being threaded through the first connector plate and having an end held in abutment against the second connector plate.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
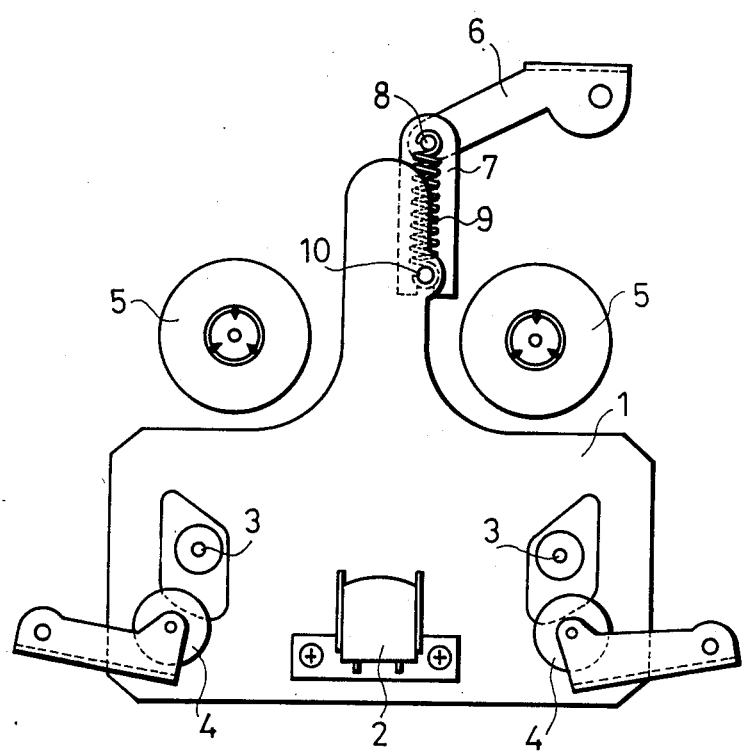
FIG. 1 is a schematic plan view of a conventional cassette tape recorder.
Figure 2:
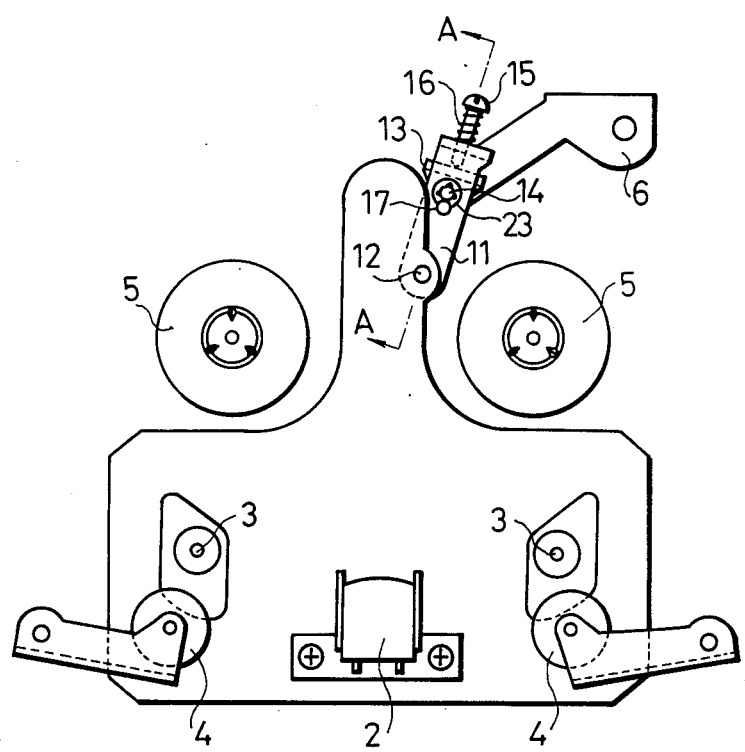
FIG. 2 is a schematic plan view of a head position adjusting device in a cassette tape recorder according to the present invention.
Figure 3:
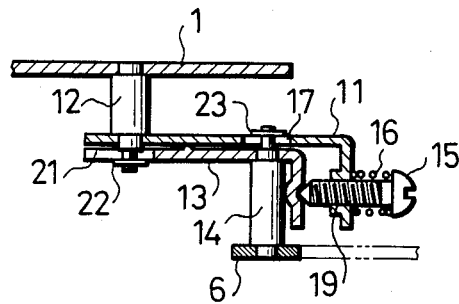
FIG. 3 is a cross-sectional view taken along line A—A of FIG. 2.
Figure 4:
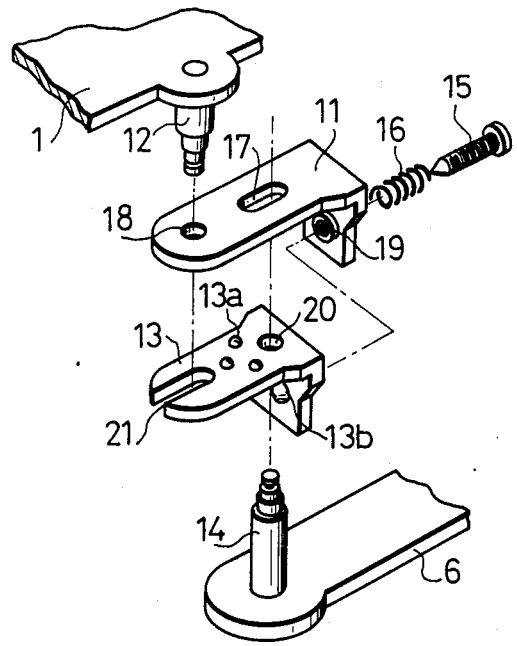
FIG. 4 is a fragmentary exploded perspective view of the head position adjusting device of the present invention.

Like reference numerals denote like parts throughout the views. As illustrated in FIGS. 2 through 4, a head position adjusting device according to the present invention comprises a first connector plate 11, a pin 12, a second connector plate 13, a pin 14, an adjustment screw 15, and a spring 16.

The first connector plate 11 is of a hook-shaped configuration including a horizontal portion having an oblong hole 17 with its longitudinal axis aligned with the longitudinal axis of the horizontal portion and a circular hole 18 with its center aligned with the longitudinal axis of the horizontal portion, and a vertical portion having a threaded hole 19. The second connector plate 13 is of a hook-shaped configuration including a horizontal portion having a plurality of convexes 13a, a hole 20, and a recess 21, and a vertical portion having a semiperipheral recess 13b.

The connector plates 11, 13 are overlapped such that the convexes 13a on the second connector plate 13 are held against the back of the first connector plate 11. With the connector plates 11, 13 thus overlapped, the pin 12 which is mounted on a head base 1 extends through the hole 18 and the recess 21, and a retaining ring 22 is fitted over the distal end of the pin 12. The pin 14 which is mounted on a play lever 6 extends through the hole 20 and the oblong hole 17, with a retaining ring 23 fitted over the distal end of the pin 14. Thus, the first and second connector plates 11, 13 are interconnected relatively slidably in the direction of the longitudinal axis of the oblong hole 17 for an interval corresponding to a clearance between the ends of the oblong hole 17 and the pin 14.

The adjustment screw 15 is threaded in the threaded hole 19 in the first connector plate 11, and has a pointed end pivotally placed in the recess 13b in the second connector plate 13. The spring 16 is coiled around the adjustment screw 15 for preventing the screw 15 from loosening.

When the play lever 6 is turned clockwise from a stop position shown in FIG. 2, the first and second connector plates 11, 13 which engage the pin 12 mounted on the head base 1 and the pin 14 mounted on the play lever 6, respectively, cause the head base 1 to be raised upwardly (as shown in FIG. 2) against a spring means (not shown). A head 2 mounted on the head base 1 is also lifted until it is brought into contact with a cassette tape loaded in a prescribed position, whereupon the cassette tape is played back.

The position of the head 2 in the playback mode is not stable due to dimensional variations of the parts. If the head 2 is not in good contact with the cassette tape, various problems tend to occur such as wow and flutter, level variations, and poor frequency characteristics.

To avoid such problems, the head position is measured by a test jig (not shown) after the cassette tape recorder has been assembled, and if the head 2 is retracted from a reference position, then the adjustment screw 15 is turned so as to be tightened. When the adjustment screw 15 is tightened, the first connector plate 11 is moved in a direction away from the second connector plate 13 since the pointed end of the adjustment screw 15 and the recess 13b remain positionally fixed as the second connector plate 13 is secured by the pin 14 to the play lever 6. Therefore, the head base 1 coupled through the pin 12 to the first connector plate 11 is moved upwardly to bring the head 2 toward the reference position.

When the head 2 is too advanced with respect to the reference position, the adjustment screw 15 is turned so as to be loosened. Upon loosening of the adjustment screw 15, the first connector plate 11 is moved to approach the second connector plate 13 since the head base 1 is urged downwardly by the spring means, thus taking the head 2 toward the reference position.

With the arrangement of the present invention, therefore, the position of the head with respect to the cassette tape can finely be adjusted by turning the adjustment screw thereby to reduce the load imposed on the entire mechanism.

Although a certain preferred embodiment has been shown and described, it should be understood that many changes and modifications may be made therein without departing from the scope of the appended claims.

What is claimed is:

1. A head position adjusting device in a cassette tape recorder, comprising:
    (a) a movable head base supporting a head thereon;
    (b) a pivotally movable play lever having an end operatively coupled to said movable head base for moving said base and head toward and away from a cassette tape loaded in a prescribed position;
    (c) a pin by which said head base and said end of said play lever are interconnected; and
    (d) an adjustment screw for adjusting the relative position of said head base and said end of said play lever at the interconnection therebetween,
    wherein a first connector plate is mounted on said head base and a second connector plate is mounted on said end of said play lever and movable relatively to said first connector plate, said adjustment screw being threaded through said first connector plate and having an end held in abutment against said second connector plate, and
    wherein said first connector plate has an oblong hole having a dimension which provides a clearance to said pin for accommodating adjustment of the relative positions of said head base and end of said play lever by said adjustment screw, said pin being mounted on said play lever and extending through said second connector plate into said oblong hole within said clearance.

* * * * *